(12) United States Patent
Reichl et al.

(10) Patent No.: US 6,396,260 B1
(45) Date of Patent: May 28, 2002

(54) MEASURING DEVICE FOR CONTACTLESS DETECTION OF A ROTATIONAL ANGLE

(75) Inventors: Asta Reichl, Stuttgart; Wolfgang Schaefer, Grossbottwar; Reiner Schweinfurth, Eppingen; Michael Stoeve, Hirschaid; Thomas Klotzbuecher, Rudersberg; Stephan Wuensch, Nuernberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,487
(22) PCT Filed: Nov. 12, 1998
(86) PCT No.: PCT/DE98/03312
§ 371 (c)(1),
(2), (4) Date: Jul. 24, 2000
(87) PCT Pub. No.: WO99/30112
PCT Pub. Date: Jun. 17, 1999

(30) Foreign Application Priority Data

Dec. 4, 1997 (DE) .......................... 197 53 776

(51) Int. Cl.⁷ .................................................. G01B 7/30
(52) U.S. Cl. .............................. 324/207.25; 324/207.2; 324/207.22
(58) Field of Search ........................ 324/207.2, 207.21, 324/207.22, 207.25, 252, 262, 166, 173, 174; 338/32 R, 32 H

(56) References Cited

U.S. PATENT DOCUMENTS 5,055,781 A    10/1991   Sakakibara et al. .... 324/207.21
5,355,373 A  * 10/1994   Salmon et al. ................. 310/71
5,444,369 A  *  8/1995   Luetzow .................... 324/207.2
5,789,917 A     8/1998   Oudet et al. ............. 324/207.2

FOREIGN PATENT DOCUMENTS

| DE | 40 14 885 A | 11/1990 |
| DE | 196 30 764 A1 | 4/1997 |
| DE | 197 00 046 A1 | 7/1997 |
| DE | 196 34 281 A1 | 2/1998 |
| EP | 0 611 951 A | 8/1994 |
| EP | 0 665 416 A | 8/1995 |

* cited by examiner

Primary Examiner—Jay Patidar
(74) Attorney, Agent, or Firm—Michael J. Striker

(57) ABSTRACT

A measuring device for contactless detection of a rotational angle ($\alpha$) comprises a carrier plate (12), made of soft-magnetic material, which acts as a rotor. Two segments (15, 16) separated by a slit (17) are disposed in a plane parallel to the carrier plate (12). Disposed on one of the segments (16) is a short-circuit piece (20), and all these parts are of soft-magnetic material. The short-circuit piece (20) and the segments (15, 16) serve to guide the magnetic flux that is generated by a permanent magnet (13) disposed on the carrier plate (12). Since the short-circuit piece (20) protrudes past the carrier plate (12), or in a further feature the carrier plate (12) protrudes past the short-circuit piece (20), insensitivity to axial or radial play is possible. Furthermore, the measuring device is relatively simple and space-saving in design.

19 Claims, 5 Drawing Sheets

MEASURING DEVICE FOR CONTACTLESS DETECTION OF A ROTATIONAL ANGLE

BACKGROUND OF THE INVENTION

The invention is based on a measuring device for contactless detection of a rotational angle. From German Published, Unexamined Patent Application DE-OS 196 34 381.3, published later, a sensor is known that is disposed in three planes one above the other. The rotor forms the middle plane and comprises the carrier plate for a permanent magnet. The carrier plate is of magnetically nonconductive material, so that the magnetic flux proceeds via the other two planes, that is, the stator, and is controlled with the aid of two spacers that are disposed between the two planes of the stator. Although a relatively wide angular range can be measured without a change of sign with this sensor, nevertheless because of the construction in three parallel planes, it is relatively large in the axial direction.

SUMMARY OF THE INVENTION

It is therefore an object of the present invention to provide a measuring device for contactless detection of a rotational angle which avoids the disadvantages of the prior art.

In keeping with these objects, one feature of present invention resides in a measuring device in which the rotor and the segments of the stator are formed in a disk-shaped manner, the rotor is composed of magnetically conductive material, and at least one short-circuit piece is disposed on one of the segments of the stator.

The measuring device for contactless detection of a rotational angle according to the invention, has the advantage over the prior art that the sensor has a relatively small size in the axial direction. It is constructed in only two planes. The carrier plate of the permanent magnet, which represents the rotor, acts at the same time to guide the magnetic flux. Furthermore, this construction reduces the number of parts and the attendant expense and effort of assembly.

By a protrusion of the short-circuit piece past the carrier plate, or of the carrier plate past the short-circuit piece, insensitivity to an axial play and/or a radial play of the sensor is attainable.

Because of its simple construction, the sensor can be integrated with relatively little effort or expense of assembly in various systems, such as a throttle measuring device, a pedal module for a transducer for the accelerator pedal value, or can be used as an independent sensor in throttle valve transducers or in a vehicle suspension system.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Exemplary embodiments of the invention are shown in the drawing and described in further detail in the ensuing description.

Further exemplary embodiments are shown in

Figure 9:
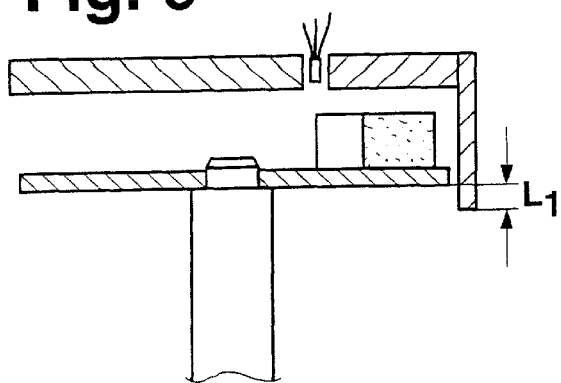
Figure 10:
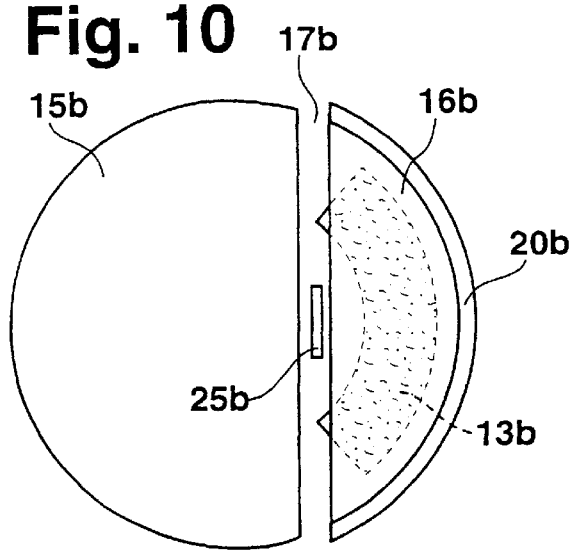
Figure 11:
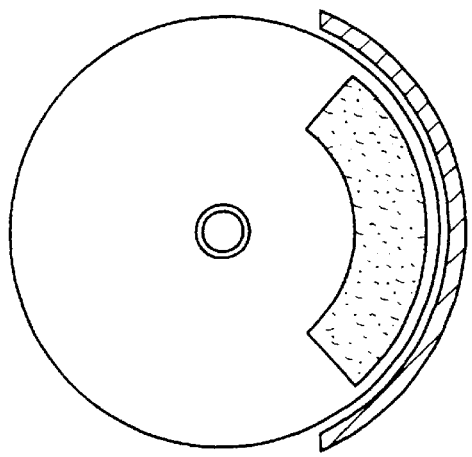

FIGS. 9, 10, 11; 12, 13, 14; and 15, 16, 17, respectively, as a longitudinal section, plan view and section in the direction I—I.

Figure 18:
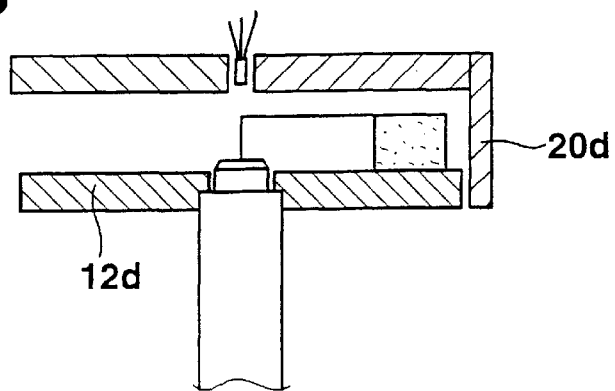
Figure 19:
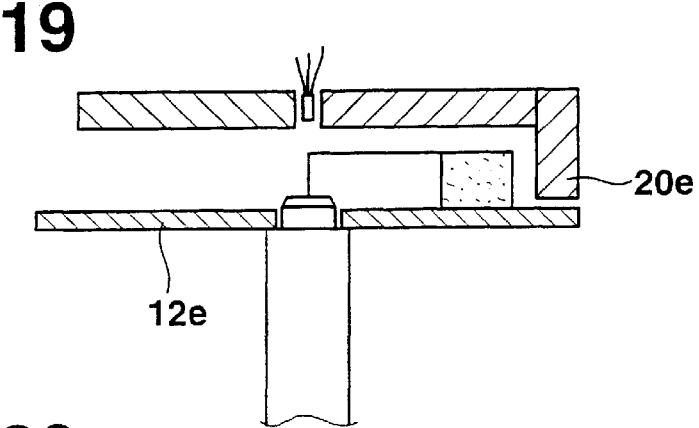

FIGS. 18 and 19 show further modifications.

Figure 20:
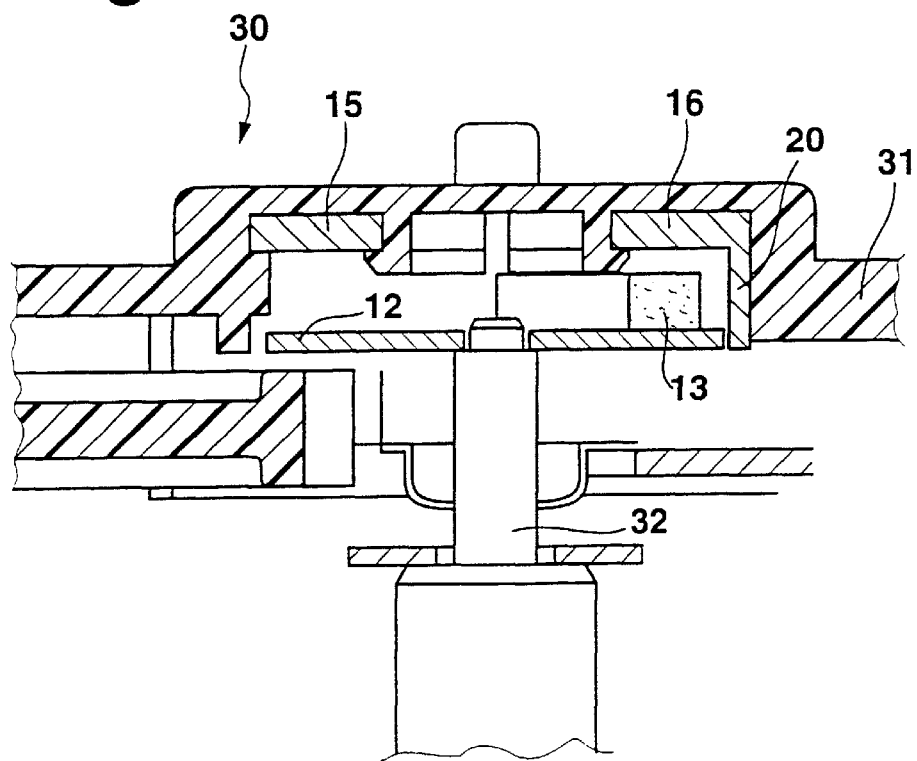

FIG. 20 shows the installation of a sensor in a throttle valve positioner in longitudinal section.

DESCRIPTION OF THE EXEMPLARY EMBODIMENTS

Figure 1:
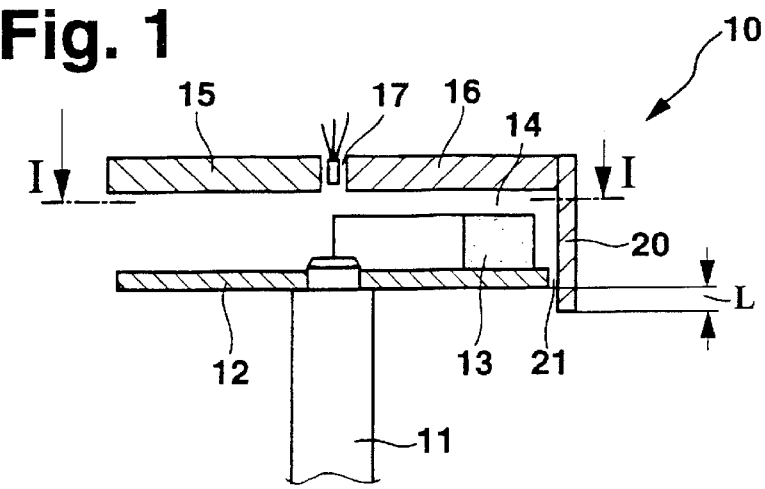
FIG. 1 shows a longitudinal section through a first exemplary embodiment.

In FIGS. 1, 10 designates a sensor, which with the aid of a shaft 11 is connected to a component, not shown, whose rotary motion is to be determined. A carrier plate 12, which simultaneously acts as a rotor, is placed centrally on the face end of the shaft 11. An annular permanent magnet 13 is disposed on the carrier plate 12, with as much radial spacing as possible from the center point, or in other words from the attachment point on the shaft 11. The greater this spacing is, the better the resolution of the measurement signal. The permanent magnet 13 can be embodied as a cutout of a circle (segment of a circle) or as a part of a circular ring. Its angular range is at least as great as the maximum rotational angle to be determined of the component to be monitored or measured. As can be seen from the views in FIGS. 2 and 3, the angular range of the permanent magnet 13 in this exemplary embodiment is approximately 180°, so that a rotational angle of up to 180° to be measured can be achieved. The permanent magnet 13 is also polarized in the axial direction, that is, perpendicular to the carrier plate 12. The carrier plate 12 is of magnetically conductive and in particular soft-magnetic material.

In a second plane above the permanent magnet 13, a stator which comprises two segments 15, 16 is disposed parallel to the carrier plate 12, with a slight gap. Between the two segments 15, 16, a continuous gap 17 is formed, which extends across the center point of the carrier plate 12 or shaft 11. The two segments 15,16 are thus embodied of equal size, and each has an angular range of 180°. On the outer face end of the segment 16, that is, not on the face end toward the gap 17, a short-circuit piece 20 is disposed over the entire length, that is, over an angular range of 180°. In terms of function, it would also be possible to embody the short-circuit piece 20 correspondingly on the segment 15. The short-circuit piece 20 protrudes past the carrier plate 12 by a length L. Furthermore, the segments 15, 16 have a slightly larger diameter than the carrier plate 12, so that a gap 21 is formed between the face end of the carrier plate 12 and the short-circuit piece. This gap 21 should be embodied as narrowly as possible, in order to enable the most unimpeded possible magnetic flux from the short-circuit piece 20 to the carrier plate 12. The gap 21 should, however, also enable an impeded rotation of the carrier plate 12. The two segments 15,16 and the short-circuit piece 20 comprise magnetically conductive, in particular soft-magnetic material. It is understood that the gap 14 located between the permanent magnet 13 and the two segments 15, 16 must also be embodied in such a way that unimpeded rotation of the carrier plate 12 with the permanent magnet 13 is possible. In the rotary motion, the same volumetric amount in each case must be displaced below the two segments 15, 16.

Figure 2:
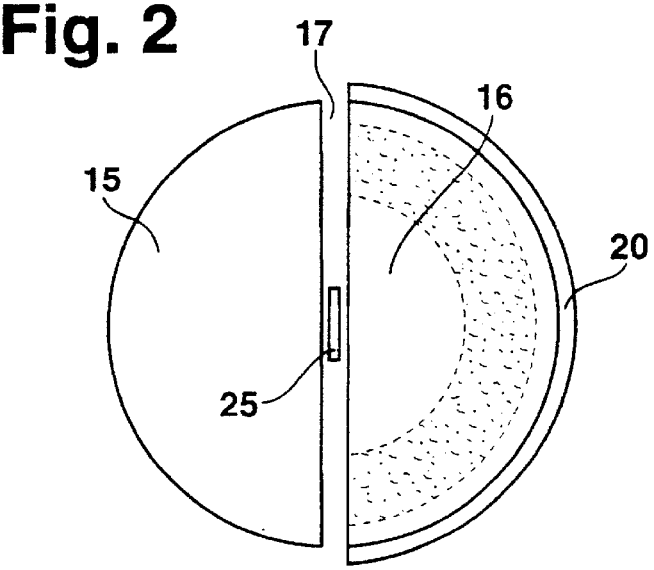
FIG. 2 shows a plan view on the exemplary embodiment of FIG. 1.
Figure 3:
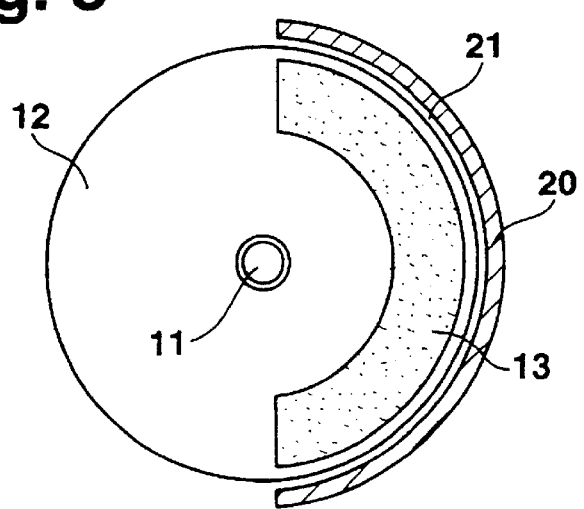
FIG. 3 is a section through the exemplary embodiment of FIG. 1 taken along the line I—I.

A magnetic-field-sensitive element 25, such as a field plate, magnet transistor, coils, magnetoresistive element, or a Hall element, is disposed in the gap 17 between the two segments 15, 16. What is important is that the magnetic-field-sensitive element have the most linear possible dependency of its output signal on the magnetic induction B. In FIGS. 1-3, in each case, a measurement with the aid of a single magnetic-field-sensitive element 25 is shown. The farther the element 25 is disposed above the shaft 11 centrally in the gap 17, the better is the measurement signal. Conversely, it would also be possible, for instance for safety reasons, to use two or more elements 25.

Figure 4:
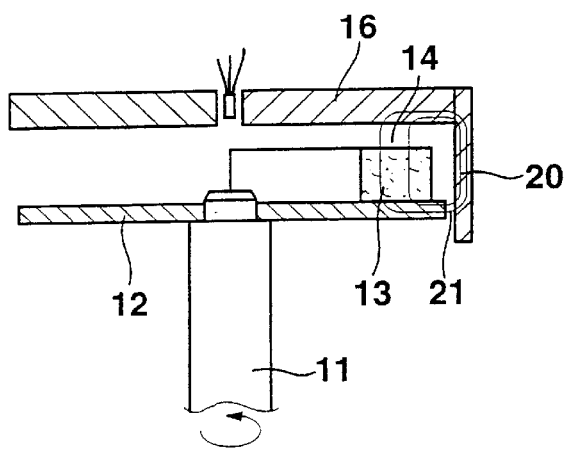
FIGS. 4 and 5 show the magnetic flux upon a rotation α by 0° and an induction B=0, respectively.
Figure 6:
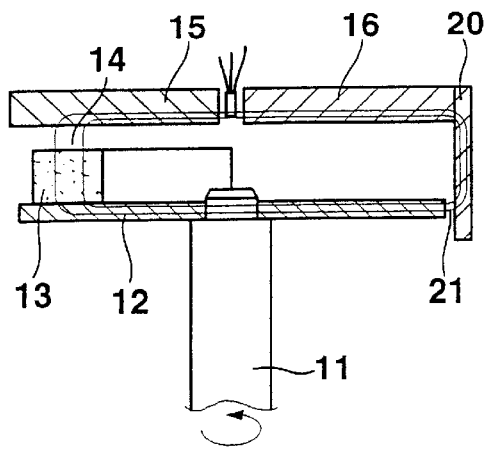
FIGS. 6 and 7 show the magnetic flux at maximal angular rotation and at an induction of B=Max, respectively.
Figure 5:
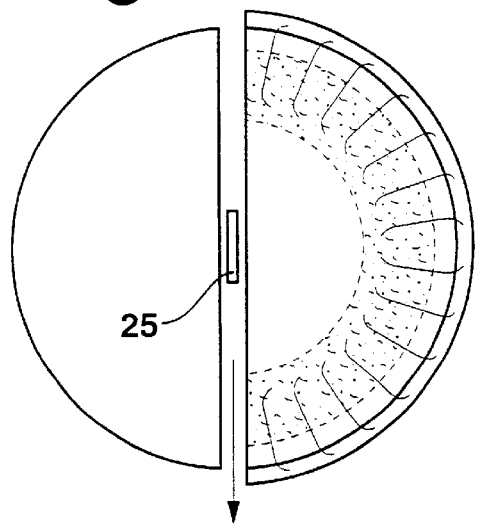
Figure 7:
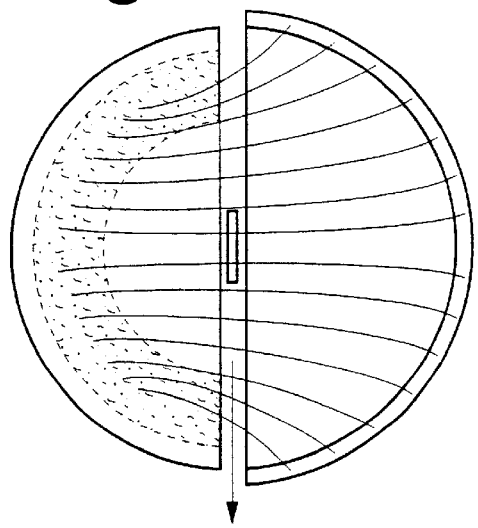
Figure 8:
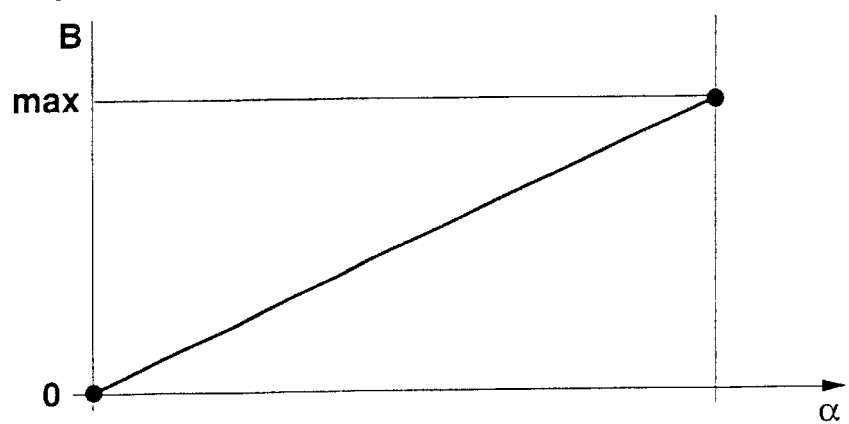
FIG. 8 shows the corresponding course of the induction B over the rotational angle α.

In FIG. 8, the course of the characteristic curve of the magnetic induction B in the element 25 is plotted over the rotational angle a of the shaft 11. It can be seen that at a rotational angle of 0°, the induction B is also 0°, while at a maximum rotational angle $\alpha$, the induction also reaches its maximum induction value. In this exemplary embodiment, a maximum rotational angle of 180° is attainable. The position of the sensor 10 at a rotational angle of 0° is shown in FIGS. 4 and 5. It can be seen that the magnetic flux from the permanent magnet 13 flows via the gap 14 to the segment 16, and from there back via the short-circuit piece 20, the gap 21 and the carrier plate 12 to the permanent magnet 13. As seen particularly from FIG. 5, the magnetic flux is controlled in such a way that at a rotational angle of 0°, it does not extend through the element 25, and thus no magnetic induction can occur in the element 25. If the shaft 11 is now rotated, and with it thus the carrier plate 12 and the permanent magnet 13, then the magnetic flux extending through the element 25 is increased, resulting in the linear measurement line shown in FIG. 8. The adjustment at a maximum rotational angle $\alpha$ is shown in FIGS. 6 and 7. In the position at a maximum rotational angle, the magnetic flux extends from the permanent magnet 13 across the gap 14 into the segment 15. From there, the magnetic flux flows through the gap 17 and the element disposed there into the segment 16, the short-circuit piece 20, across the gap 21 into the carrier plate 12, and back into the permanent magnet 13. Particularly from FIG. 7, it can be seen that at this angular position, a maximum possible magnetic induction B is effected in the element 25.

To enable an unimpeded, error-free magnetic flux in these exemplary embodiments, the face end of the carrier plate 12 in the region of the gap 21 must be covered at least by the short-circuit piece 20. However, since fluctuations can occur upon the rotation of the carrier plate 12 or as a result of structural tolerances, the short-circuit piece 20 protrudes past the carrier plate 12 by the length L. As a result, the sensor 10 is insensitive to axial play.

Figure 15:
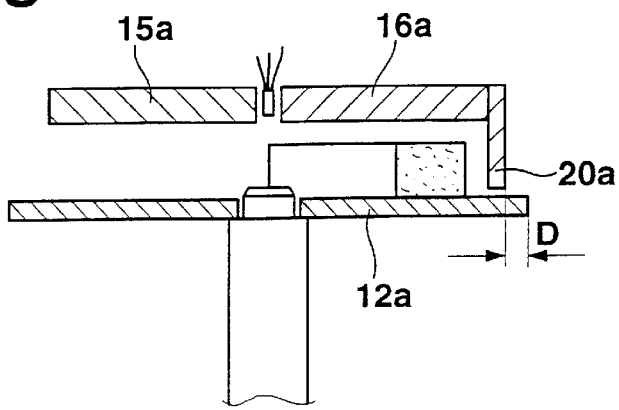
Figure 16:
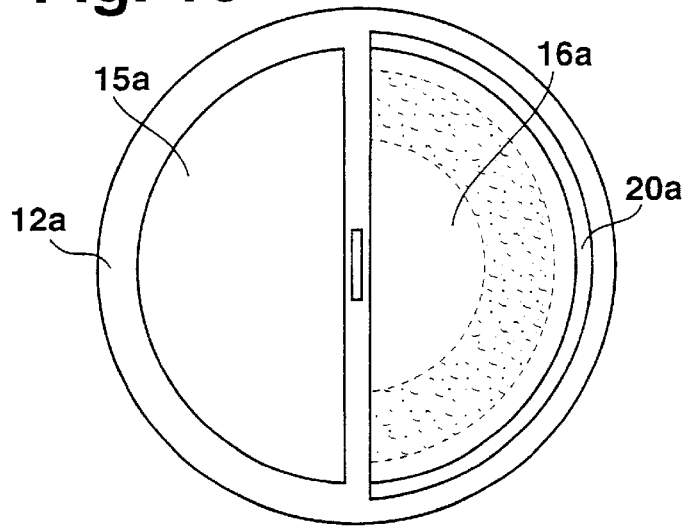
Figure 17:
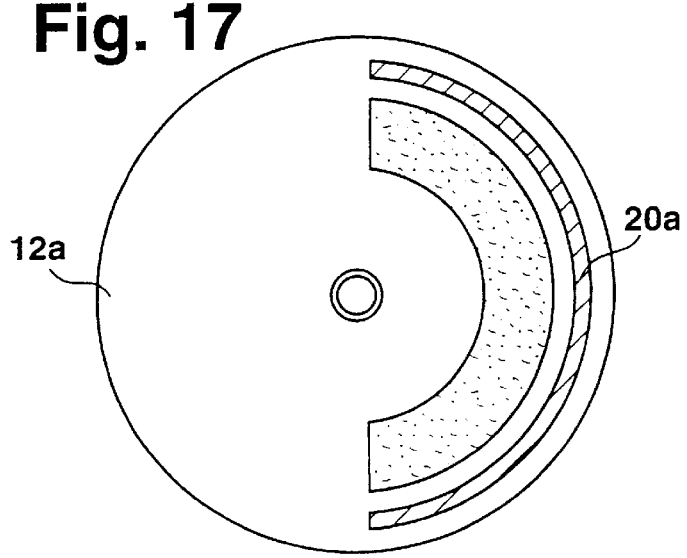

In FIGS. 15-17, a modification is now shown in which insensitivity to radial play is achieved. In this exemplary embodiment, the carrier plate 12a protrudes past the short-circuit piece 20a by the distance D. This also means that the segments 15a and 16a have a smaller diameter than the carrier plate 12a.

In the modifications of the further exemplary embodiments, structural features are shown for making it possible to detect different rotational angles. In the exemplary embodiment of FIGS. 9-11, an asymmetrical position of the gap 17b is shown. Here the segments 15b and 16b are embodied of different sizes. The size of the permanent magnet 13b, or its angle, is defined on the covered area of the associated segment 16b by the short-circuit piece 20b disposed there. If only a single element 25b is used, then once again it can be disposed centrally in the gap 17b.

Figure 12:
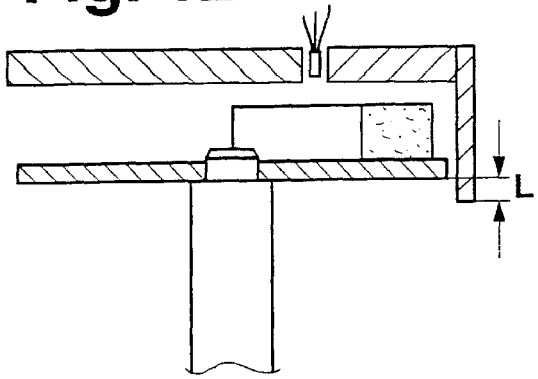
Figure 13:
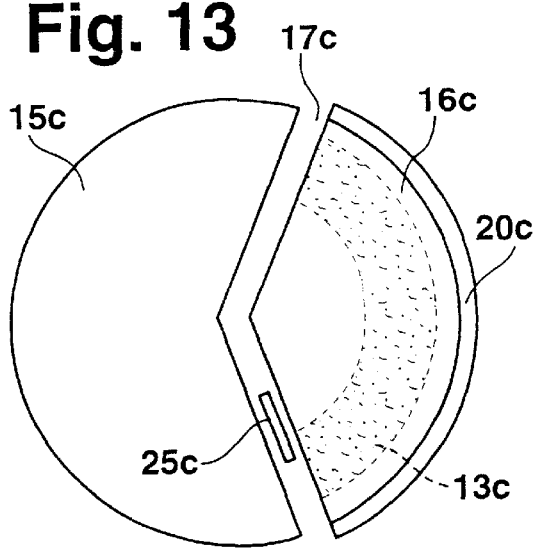
Figure 14:
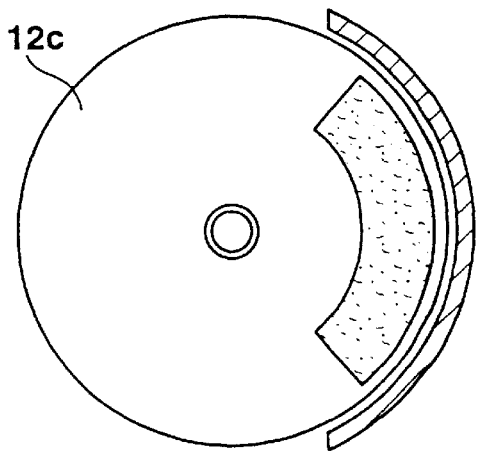

In the exemplary embodiment of FIGS. 12-14, an angled disposition of the two segments 15c and 16c is shown. The gap 17c extends at an angle, and the slit 17c extends across the center point of the carrier plate 12c. The element 25c is disposed eccentrically in one of the two arms of the gap 17c. Once again, the angular range of the permanent magnet 13c amounts at maximum to the angle of the segment 16c associated with it; that is, in the basic position, the permanent magnet 13c is covered completely by the segment 16c, and the short-circuit piece 20c is disposed on the segment 16c. This embodiment is especially suitable for measuring relatively small angles.

The exemplary embodiments described above are adapted to a relatively thin carrier plate and a relatively thin short-circuit piece. As shown in FIG. 18, instead of the protruding short-circuit piece, the carrier plate can also be made thicker, so that the underside of the carrier plate 12d is approximately flush with the face end of the short-circuit piece 20d. Since in the lower region, that is, near the underside of the carrier plate 12d, only a slight magnetic flux crosses over, as a result axial fluctuations in tolerance can now affect the measurement signal only slightly. This is also true if, as shown in FIG. 19, the short-circuit piece 20e is made thicker, and its outside is flush with the face end of the carrier plate 12e.

In the exemplary embodiment of FIG. 20, the installation of an above-described sensor in a throttle valve control unit 30 is shown. With the aid of this unit 30, the rotational angle of a throttle valve is detected for an engine control unit. The stator 15, 16 here is disposed directly in the cap 31 of the throttle valve control unit 30. Since the cap 31 is of plastic, the stator 15, 16 can be injected into the cap 31 jointly with the short-circuit piece 20. However, it would also be possible for the two segments 15, 16 of the stator to be clipped into the cap 31, or glued into it. The one or two magnetic-field-sensitive elements 25, which is or are connected to the plug injected into the cap 31, is or are located in the gap between the segments 15, 16; this is not shown in FIG. 18. The shaft 11 here is secured directly to the shaft 32 of the throttle valve or to an extension of that shaft 32. The rotor 12 with the permanent magnet 13 is thus secured directly to the shaft 32 of the throttle valve. The sensor of exemplary embodiments 1-19 can be built into a throttle valve control unit 30 without major modifications. Thus for instance the potentiometer previously used can simply be replaced. In FIG. 20, the installation of a sensor of FIG. 1 is shown. It is understood that a sensor of FIG. 9 or 12 can also be used.

What is claimed is:

1. A measuring device for contactless detection of a rotational angle of a component, comprising a stator, a rotor connectable to the component; a permanent magnet disposed on said rotor and having a direction of polarization oriented in an axial direction of said rotor, said stator and said rotor being arranged so that an air gap is provided between said stator and said rotor, said stator and said rotor being disposed in planes one above the other, said stator including at least two segments which are separated by at least one magnetically non conductive gap; at least one magnetic-field-sensitive element located in said at least one gap, at least one of said segments of said stator having no magnetically conductive connection with said rotor, said rotor and said segments of said stator being arranged in a disk-shaped fashion, said rotor comprising a magnetically conductive material; and at least one short-circuit piece which protrudes past said rotor and disposed on one of said segments.

2. A measuring device as defined in claim 1, wherein said segments are arranged symmetrically.

3. A measuring device as defined in claim 1, wherein said segments are arranged asymmetrically.

4. A measuring device as defined in claim 1; and further comprising a shaft connectable with the component, said rotor being disposed without play on said shaft.

5. A measuring device as defined in claim 1; and further comprising a cap, said stator having a part disposed in said cap.

6. A measuring device as defined in claim 5, wherein said cap comprises plastic, said stator being injected into said cap.

7. A measuring device for contactless detection of a rotational angle of a component, comprising a stator, a rotor connectable to the component; a permanent magnet disposed on said rotor and having a direction of polarization oriented in an axial direction of said rotor, said stator and said rotor being arranged so that an air gap is provided between said stator and said rotor, said stator and said rotor being disposed in planes one above the other, said stator including at least two segments which are separated by at least one magnetically non-conductive gap; at least one magnetic-field-sensitive element located in said at least one gap, at least one of said segments of said stator having no magnetically conductive connection with said rotor, said rotor and said segments of said stator being arranged in a disk-shaped fashion, said rotor comprising a magnetically conductive material; and at least one short-circuit piece disposed on one of said segments, said rotor protruding past said short-circuit piece.

8. A measuring device as defined in claim 7, wherein said segments are arranged symmetrically.

9. A measuring device as defined in claim 7, wherein said segments are arranged asymmetrically.

10. A measuring device as defined in claim 7; and further comprising a shaft connectable with the components, said rotor being disposed without play on said shaft.

11. A measuring device as defined in claim 7; and further comprising a cap, said stator having a part disposed in said cap.

12. A measuring device as defined in claim 11, wherein said cap comprises plastic, said stator being injected into said cap.

13. A measuring device as defined in claim 1, wherein said segments are arranged symmetrically.

14. A measuring device for contactless detection of a rotational angle of a component, comprising a stator, a rotor connectable to the component; a permanent magnet disposed on said rotor and having a direction of polarization oriented in an axial direction of said rotor, said stator and said rotor being arranged so that an air gap is provided between said stator and said rotor, said stator and said rotor being disposed in planes one above the other, said stator including at least two segments which are separated by at least one magnetically non conductive gap; at least one magnetic-field-sensitive element located in said at least one gap, at least one of said segments of said stator having no magnetically conductive connection with said rotor, said rotor and said segments of said stator being arranged in a disk-shaped fashion, said rotor comprising a magnetically conductive material; and at least one short-circuit piece disposed on one of the segments, said rotor and said short-circuit piece having different thicknesses.

15. A measuring device as defined in claim 14, wherein said segments are arranged symmetrically.

16. A measuring device as defined in claim 14, wherein said segments are arranged asymmetrically.

17. A measuring device as defined in claim 14; and further comprising a shaft connectable with the component, said rotor being disposed without play on said shaft.

18. A measuring device as defined in claim 14; and further comprising a cap, said stator having a part disposed in said cap.

19. A measuring device as defined in claim 14, wherein said cap comprises plastic, said stator being injected into said cap.

* * * * *